United States Patent
Thorn et al.

(10) Patent No.: US 8,225,229 B2
(45) Date of Patent: Jul. 17, 2012

(54) ADJUSTING DISPLAY BRIGHTNESS AND/OR REFRESH RATES BASED ON EYE TRACKING

(75) Inventors: Ola Karl Thorn, Lund (SE); Simon Lessing, Malmo (SE)

(73) Assignee: Sony Mobile Communications AB, Lund (SE)

( * ) Notice: Subject to any disclaimer, the term of this patent is extended or adjusted under 35 U.S.C. 154(b) by 702 days.

(21) Appl. No.: 11/558,361

(22) Filed: Nov. 9, 2006

(65) Prior Publication Data

US 2008/0111833 A1  May 15, 2008

(51) Int. Cl.
*G06F 3/00* (2006.01)
*G06F 3/048* (2006.01)

(52) U.S. Cl. ........ 715/802; 715/764; 715/767; 715/805; 715/821; 715/823

(58) Field of Classification Search .................. 345/156; 715/821, 805, 863, 764, 767, 802, 823
See application file for complete search history.

(56) References Cited

U.S. PATENT DOCUMENTS

| | | | |
|---|---|---|---|
| 4,836,670 A * | 6/1989 | Hutchinson | 351/210 |
| 4,950,069 A * | 8/1990 | Hutchinson | 351/210 |
| 4,973,149 A * | 11/1990 | Hutchinson | 351/210 |
| 5,185,597 A * | 2/1993 | Pappas et al. | 715/856 |
| 5,186,629 A * | 2/1993 | Rohen | 434/114 |
| 5,471,542 A * | 11/1995 | Ragland | 382/128 |
| 5,559,533 A * | 9/1996 | Hicok et al. | 345/162 |
| 5,583,795 A * | 12/1996 | Smyth | 702/150 |
| 5,598,565 A | 1/1997 | Reinhardt | 395/750 |
| 5,668,571 A * | 9/1997 | Pai et al. | 715/794 |
| 5,835,083 A * | 11/1998 | Nielsen et al. | 345/211 |
| 5,844,544 A * | 12/1998 | Kahn et al. | 345/156 |
| 5,898,423 A * | 4/1999 | Tognazzini et al. | 345/158 |
| 6,067,069 A * | 5/2000 | Krause | 345/685 |
| 6,152,563 A * | 11/2000 | Hutchinson et al. | 351/209 |
| 6,204,828 B1 * | 3/2001 | Amir et al. | 345/7 |
| 6,323,884 B1 * | 11/2001 | Bird et al. | 715/810 |
| 6,603,491 B2 * | 8/2003 | Lemelson et al. | 715/784 |
| 6,664,955 B1 * | 12/2003 | Deering | 345/418 |
| 6,731,315 B1 * | 5/2004 | Ma et al. | 715/856 |
| 6,791,531 B1 * | 9/2004 | Johnston et al. | 345/157 |
| 6,876,397 B2 * | 4/2005 | Funakoshi et al. | 348/569 |
| 7,082,577 B1 * | 7/2006 | Brosnahan | 715/860 |
| 7,401,920 B1 * | 7/2008 | Kranz et al. | 351/210 |
| 7,509,592 B1 * | 3/2009 | Martinez | 715/862 |
| 7,656,413 B2 * | 2/2010 | Khan et al. | 345/589 |
| 2002/0190946 A1 * | 12/2002 | Metzger | 345/156 |

(Continued)

OTHER PUBLICATIONS

Delia et al. U.S. Appl. No. 09/046,830, abandoned unpublished application became abandoned and available as prior art on Sep. 12, 2000 and also claimed as a priority document in Ma et al. 6,731,315.*

(Continued)

*Primary Examiner* — Ba Huynh

(74) *Attorney, Agent, or Firm* — Snyder, Clark, Lesch & Chung, LLP

(57) ABSTRACT

A device may determine an area at which a user gazes on the display screen. The device may identify on the display screen a screen region which does not overlap the area, may darken the identified screen region, and/or may refresh the display screen by updating a screen region that overlaps the area and not updating the identified screen region.

23 Claims, 7 Drawing Sheets

U.S. PATENT DOCUMENTS

| | | | |
|---|---|---|---|
| 2003/0052903 A1 | 3/2003 | Weast | 345/690 |
| 2003/0135288 A1 | 7/2003 | Ranganathan et al. | 700/22 |
| 2003/0146897 A1* | 8/2003 | Hunter | 345/102 |
| 2004/0017472 A1* | 1/2004 | Gorodnichy | 348/169 |
| 2004/0056900 A1 | 3/2004 | Blume | 345/807 |
| 2004/0070565 A1* | 4/2004 | Nayar et al. | 345/156 |
| 2004/0233146 A1 | 11/2004 | Nguyen | 345/82 |
| 2004/0240709 A1* | 12/2004 | Shoemaker | 382/103 |
| 2005/0024586 A1* | 2/2005 | Teiwes et al. | 351/209 |
| 2005/0175218 A1* | 8/2005 | Vertegaal et al. | 382/103 |
| 2006/0101293 A1* | 5/2006 | Chandley et al. | 713/300 |
| 2006/0109242 A1* | 5/2006 | Simpkins | 345/156 |
| 2006/0256083 A1* | 11/2006 | Rosenberg | 345/156 |
| 2007/0146294 A1* | 6/2007 | Nurmi et al. | 345/102 |
| 2007/0146344 A1* | 6/2007 | Martin et al. | 345/173 |

OTHER PUBLICATIONS

International Preliminary Report on Patentability for corresponding PCT Application No. PCT/IB2007/051754, mailed Jan. 23, 2009, 8 pages.

International Search Report and Written Opinion for corresponding PCT Application No. PCT/IB2007/051754, mailed Aug. 29, 2007.

* cited by examiner

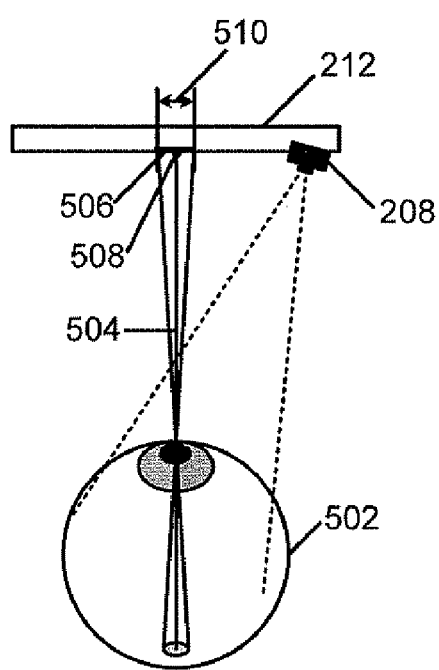 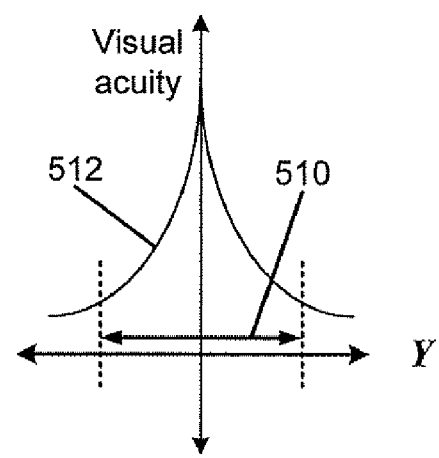
Fig. 5A
Fig. 5B

A
ADJUSTING DISPLAY BRIGHTNESS AND/OR REFRESH RATES BASED ON EYE TRACKING

TECHNICAL FIELD OF THE INVENTION

Implementations described herein pertain to adjusting an electronic display and, in particular, to methods and apparatuses for adjusting brightness and/or refresh rates in display regions based on information associated with a location at which a user is looking on the display.

DESCRIPTION OF RELATED ART

There are many techniques for adjusting brightness of display screens. For example, a screen saver may temporarily replace stationary, bright images on a display screen with moving figures to prevent screen burnout and to increase screen lifespan. An energy saver may turn off or dim a brightly lit screen in order to save energy. However, these techniques for controlling display brightness depend on user inactivity at a keyboard, mouse, and/or device that receives inputs and thus, can inconveniently erase all images on the screen, if the user does not use the keyboard, mouse, and/or device for an extended period of time. In addition, these techniques do not properly handle bistable display screens, which require little energy to maintain displayed images but a lot of energy to refresh the images.

SUMMARY

According to one aspect, a method may comprise determining an area at which a user gazes on a display screen and identifying on the display screen, based on the location, a screen region that does not overlap the area. The method may further comprise darkening the identified screen region.

Additionally, the method may further comprise determining a size and a location of the identified screen region and a size and a location of a screen region which overlaps the area.

Additionally, the method may further comprise determining a distance from the identified screen region to the area.

Additionally, the method may further comprise determining a brightness level of the identified screen region.

Additionally, the method may further comprise determining colors of pixels in the identified screen region.

Additionally, darkening the identified screen region may include displaying the determined colors.

Additionally, determining the area at which the user gazes may include determining the location based on eye-tracking data.

Additionally, the method may further comprise monitoring a position of an eye of the user and generating the eye-tracking data based on the monitored position.

Additionally, determining the area at which the user gazes may include estimating the location based on user inputs.

According to another aspect, a device may comprise one or more processors to obtain an area at which a user gazes on a display screen, identify one or more portions of the display screen, select at least one identified portion that includes at least part of the area, and dim at least one portion that is not selected and that does not include at least part of the area.

Additionally, the area may cover on the display screen a visually acute portion of a visual field of the user.

Additionally, the one or more identified screen portions may be contiguous.

Additionally, the one or more identified screen portions may not be contiguous.

Additionally, the device may further comprise an eye-tracking logic to monitor a position of an eye of the user and determine eye-tracking data based on the monitored position.

Additionally, the one or more processors may be further configured to determine a size and a position of at least one of the one or more identified portions.

Additionally, the one or more processors may be further configured to determine a distance from the area to one of the one or more identified portions.

Additionally, the one or more processors may be further configured to generate a luminance value for at least one portion that is not selected and that does not include at least part of the area.

Additionally, the one or more processors may be further configured to produce colors for pixels in at least one portion that is not selected and that does not include at least part of the area.

Additionally, the one identified portion includes an entire area of the display screen.

According to yet another aspect, a device may comprise means for determining an area at which a user looks on a display screen, means for detecting one or more screen divisions that include the area, and means for reducing a brightness of a portion of the display screen other than the detected one or more screen divisions.

According to a further aspect, a device may comprise one or more processors to locate an area at which a user gazes on a display screen, identify one or more portions of the display screen, select at least one identified portion that includes at least part of the area, and refresh the display screen by updating the selected portion and not updating at least one identified portion that does not include at least part of the area.

Additionally, the area may cover\ on the display screen a visually acute portion of a visual field of the user.

According to a further aspect, a method may comprise determining an area at which a user gazes on a display screen, identifying screen regions that overlap the area on the display screen, and refreshing the display screen by updating the identified screen regions and not updating screen regions that do not overlap the area.

Additionally, determining the area at which the user gazes may include locating the area based on eye-tracking data.

Additionally, the method may further comprise tracking a direction of an eye of the user and generating the eye-tracking data based on the tracked direction.

According to a further aspect, a method may comprise locating an area at which a user gazes on a display screen, identifying on the display screen a screen region that does not overlap the area, darkening the identified screen region, and refreshing the display screen by updating a screen region that overlaps the area and not updating the identified screen region.

BRIEF DESCRIPTION OF THE DRAWINGS

The accompanying drawings, which are incorporated in and constitute a part of this specification, illustrate embodiments of the teachings described herein, together with the description, and explain the teachings. In the drawings.

FIG. 5A shows a functional diagram of a human eye and parameters associated with its field of vision;

FIG. 5B illustrates visual acuity of a human eye as a function of distance from a foveal point;

DETAILED DESCRIPTION OF EMBODIMENTS

The following detailed description refers to the accompanying drawings. The same reference numbers in different drawings may identify the same or similar elements.

Exemplary Device

Figure 1:
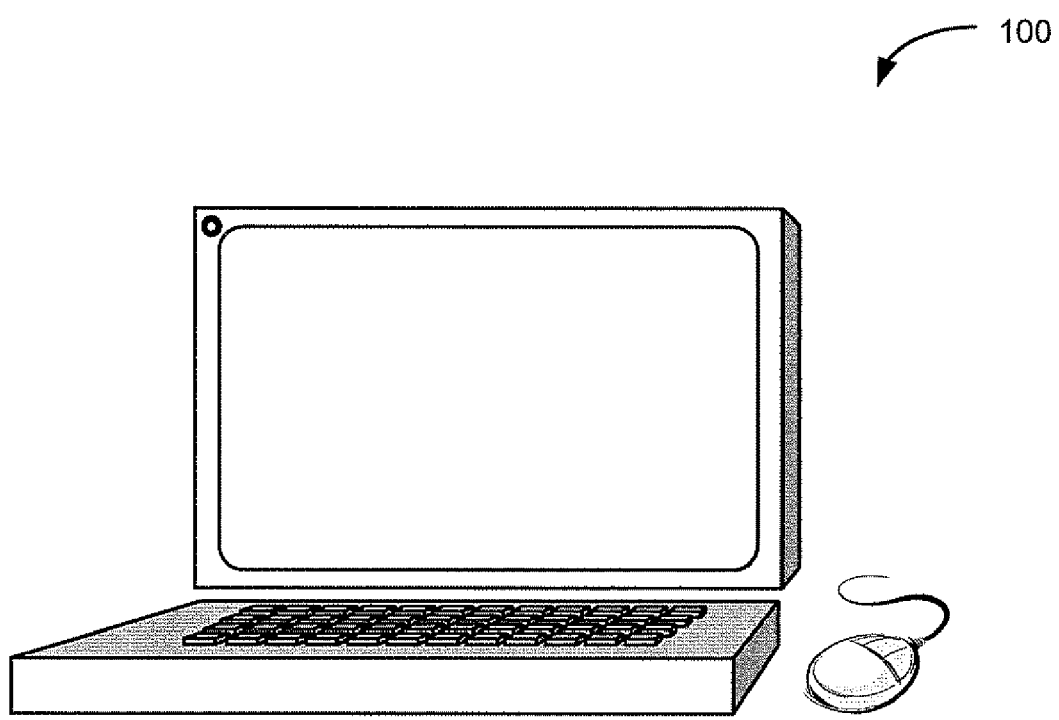
FIG. 1 depicts an exemplary device in which systems and method described herein can be implemented.

FIG. 1 depicts an exemplary device in which systems and methods described herein can be implemented. Device 100 may include any of the following devices that incorporate or are adapted to incorporate one or more display screens: a radio telephone; a personal communications system (PCS) terminal that may combine cellular radiotelephone with data processing, facsimile, and data communications capabilities; a mobile telephone; an electronic notepad; a laptop; a personal computer (PC); a personal digital assistant (PDA) that can include a radiotelephone, pager, Internet/intranet access, web browser, organizer, calendar, and/or Global Positioning System (GPS) receiver; or any device with sufficient computing power and memory to support functions described herein.

Figure 2:
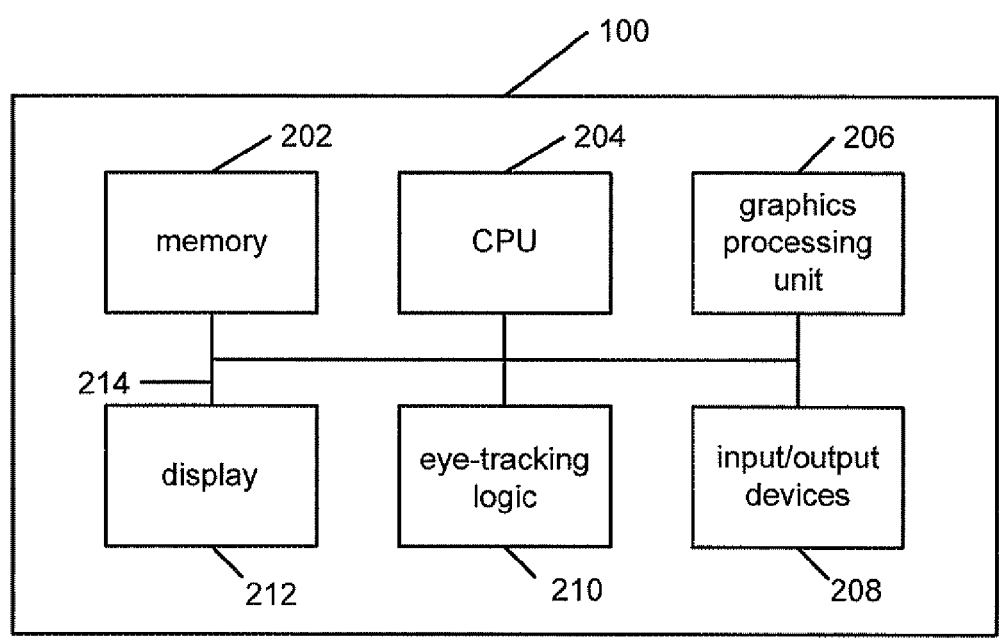
FIG. 2 shows a functional block diagram of the exemplary device of FIG. 1.

FIG. 2 shows a functional block diagram of exemplary device 100 in FIG. 1. Device 100 may include memory 202, central processing unit (CPU) 204, graphics processing unit (GPU) 206, input/output devices 208, eye-tracking logic 210, display screen 212, and communications interface 214. Memory 202 may include static memory, such as read only memory (ROM), and/or dynamic memory, such as random access memory (RAM), video RAM, or onboard cache, for storing data and machine-readable instructions. Memory 202 may also include storage devices, such as a floppy disk, CD ROM, CD read/write (R/W) disc, and/or flash memory, as well as other types of storage devices.

CPU 204 may include one or more processors, microprocessors, and/or processing logic capable of controlling device 100. GPU 206 may include a graphics rendering device, such as a dedicated graphics card and/or an integrated graphics processor that may use a portion of memory 202. GPU 206 may perform computation, manipulation and display of graphics and may control the brightness and refresh rates of display screen 212, with or without participation from CPU 204. Input/output devices 208 may include a printer, keyboard, mouse, speaker, microphone, digital camera, digital video camera, and/or other types of devices for converting physical events or phenomena to and/or from digital signals that pertain to device 100.

Eye-tracking logic 210 may include hardware and/or software for determining a location on display screen 212 at which a user is looking. Eye-tracking logic 210 may use various techniques for determining the location on display screen 212. For example, eye-tracking logic 210 may track a user's eye movements. In this case, eye-tracking logic 210 can include, or operate in conjunction with, a video camera to determine movements of a user's eye. In another implementation, eye-tracking logic 210 may use cursor movements or text inputs to estimate a location at which a user is looking. In this case, it may be assumed that if the user moves a cursor to or enters text at a particular location on display screen 212, the user is likely to be looking at that location on display screen 212.

Display screen 212 may include a device that can display signals generated by device 100 as images on a screen. Examples of display screens include a liquid crystal display (LCD) screen, cathode ray tube (CRT) display screen, organic light-emitting diode (OLED) display screen, surface-conduction electron-emitter display (SED) screen, plasma display screen, field emission display (FED) screen, and bistable display screen. In practice, device 100 may include one or more display screens.

Communications interface 214 may provide an interface through which components of device 100 can communicate with one another.

Figures 3A, 3B:
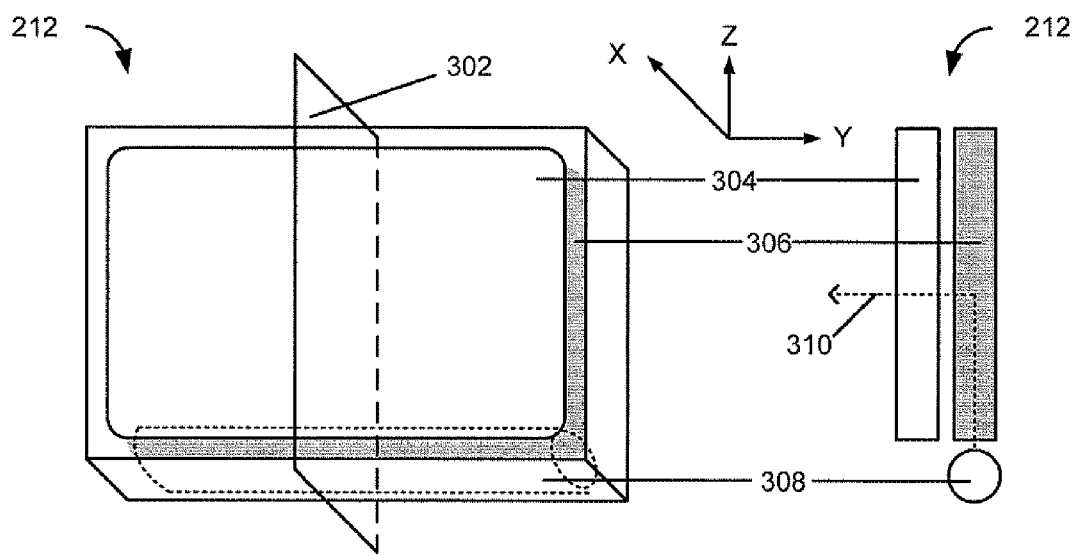
FIG. 3A illustrates a functional perspective diagram of an exemplary implementation of a display screen.
FIG. 3B illustrates a cross-sectional view of the display screen in FIG. 3A.

FIG. 3A illustrates a functional perspective diagram of exemplary implementation of display screen 212. FIG. 3B illustrates the cross-sectional view of display screen 212, at X-plane 302. In this particular implementation, display screen 212 may take the form of a liquid crystal display.

Display screen 212 may include liquid crystal display 304, light guide 306, and light source 308. Liquid crystal display 304 may include a matrix of pixels, each of which includes red, blue, and green sub-pixels. When light 310 passes through a sub-pixel, it illuminates the sub-pixel to a particular brightness (i.e., luminance), which may be a function of two factors: intensity of light 310 and sub-pixel driver/control signals (not shown) that affect color shading. Light guide 306 may include a device for receiving light rays from light source 308 and for diffusing the light rays within its body. Light guide 306 may uniformly illuminate liquid crystal display 304. Light source 308 may include a device for illuminating liquid crystal display 304. In FIGS. 3A and 3B, light source 308 is shown as a cylindrical device whose longitudinal axis is parallel to the bottom horizontal-edge of light guide 306. However, light source 308 may be implemented with multiple lamps, positioned at different places around light guide 306.

In an alternative implementation, display screen 212 may include a bistable display screen (not shown). A bistable display screen requires little energy to maintain displayed images but a lot of energy to update or refresh the images.

Exemplary Adjustment of Screen Brightness

Figure 4:
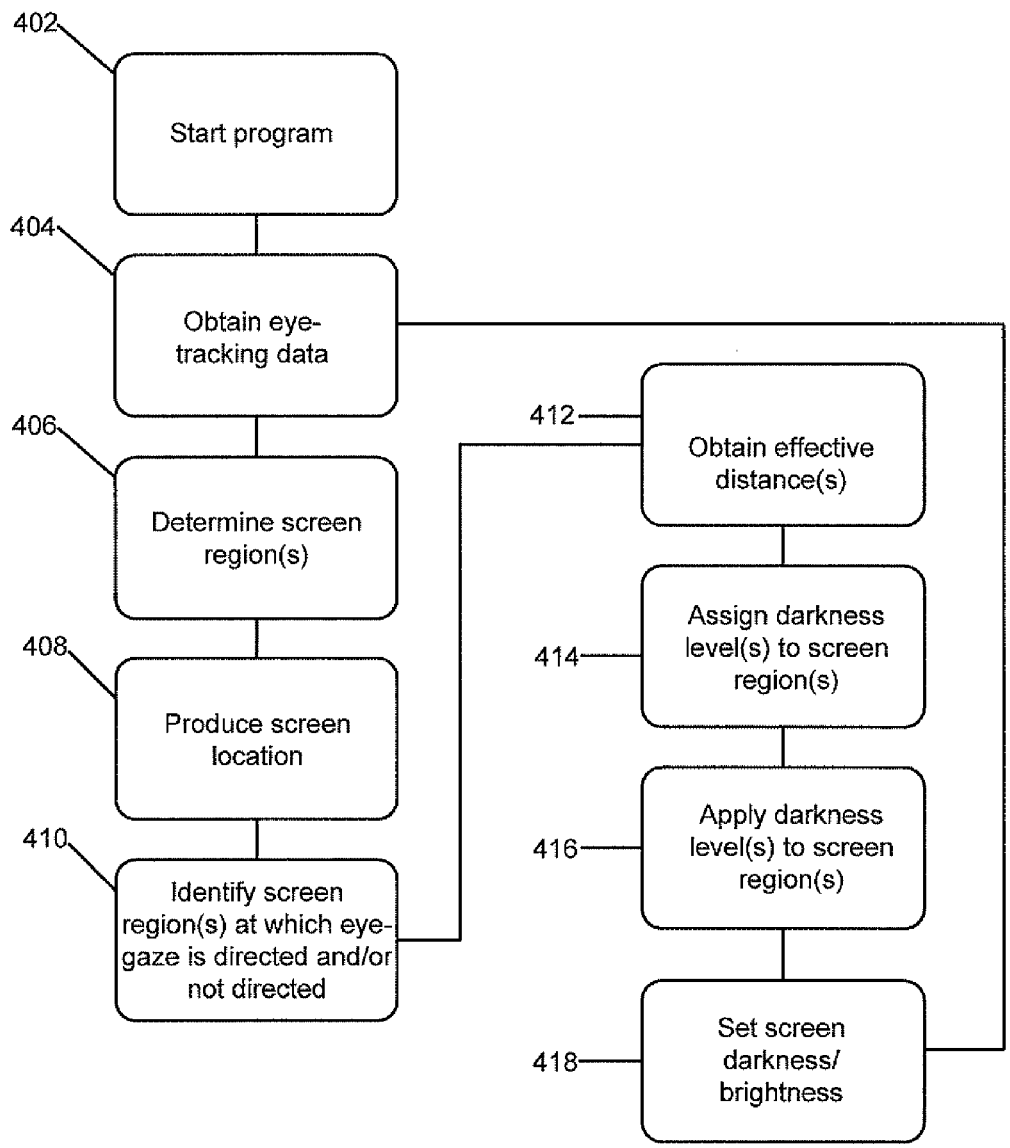
FIG. 4 shows an exemplary process for adjusting the brightness of a display screen.

FIG. 4 shows an exemplary process for adjusting the brightness of display screen 212. At block 402, a program may be started either automatically or when instructed by a user at device 100. The program may be a device driver, a daemon that resides in memory 202, or any program that may perform one or more tasks associated with adjusting screen brightness. After the program starts, eye-tracking data may be obtained from eye-tracking logic 210 (block 404). The eye-tracking data may contain information that is needed to derive the screen location at which the user gazes, and, additionally, can contain information about the distance of the user's eye from display screen 212.

At block 406, screen regions within display screen 212 may be determined. A "screen region," as used herein, may be defined as a screen area that may be treated as a unit for adjusting screen brightness. Determining screen regions may include determining the size and location of each screen region.

Screen regions may be determined in accordance with a specific strategy. For example, if the strategy is to decrease the brightness of or to set completely dark entire display screen 212 when a user's eye does not gaze at display screen 212, a screen region may be determined as a whole display screen.

In another example, screen regions may be determined based on general properties of a human eye, illustrated in FIG. 5A. More specifically, FIG. 5A shows a functional diagram of an eye 502 and parameters associated with its field of vision. A visual field includes a foveal field and a peripheral field. The foveal field surrounds direct line of sight 504 and is characterized by high visual acuity. Projected onto display screen 212, the foveal field covers foveal area 506 which is characterized by foveal point 508 and diameter 510. The peripheral field covers the remainder of the visual field and, in the peripheral field, visual acuity with which images may be perceived decreases as the images move away from direct line of sight 504. This is shown in FIG. 5B, which illustrates visual acuity curve 512 as a function of distance from foveal point 508. Because the visual acuity in the peripheral field is not as great as it is in the foveal field, the luminance (i.e., brightness) of screen regions that are in the peripheral field may be decreased without reducing perceived visual information.

Figure 6A:
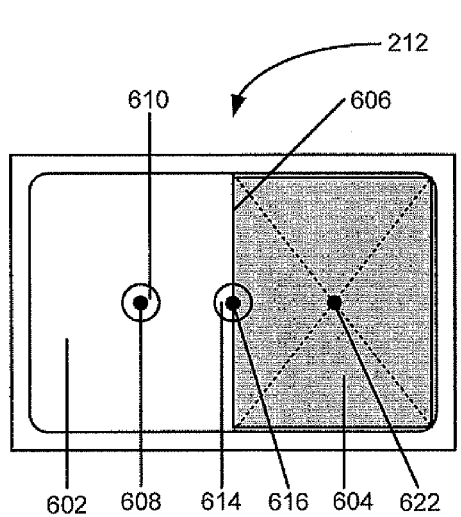
FIG. 6A shows a display screen that is partitioned into two vertical screen regions.

FIG. 6A shows exemplary screen regions that are determined as two rectangles, based on the general properties of a human eye. Each of screen regions 602 and 604 includes a screen area which may be resealed as a unit. While screen regions 602 and 604 are illustrated as being rectangular, screen regions in general may have circular, hexagonal, elliptical, or any suitable geometrical shape. The geometrical shape may also include a polygon with sides that are made of straight line segments or a figure derived by replacing any number of sides of the polygon with curved lines. Screen regions may not necessarily be contiguous and may partially overlap each other. As shown in FIG. 6A, the size of screen regions 602/604 is a half of the display screen size, and their locations may be defined by display screen boundaries and by line 606, which partitions display screen 212. The brightness of the screen region that is in the peripheral field may be decreased without reducing perceived visual information.

Figure 6B:
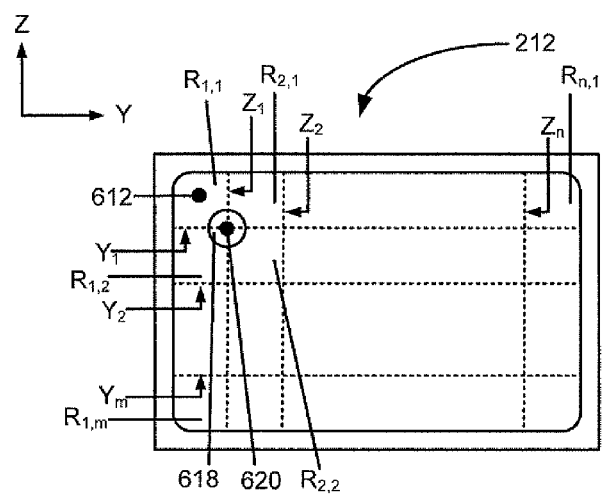
FIG. 6B shows a display screen that is partitioned into m×n screen regions.

In another example, FIG. 6B shows display screen 212 whose screen regions are determined as m×n rectangles, where each of m and n denotes any integer that is greater than or equal to 1. The size of each screen region in FIG. 6B is given by display screen size/(m·n), and their locations may be defined by the intersections of lines $Y_1, Y_2, \ldots Y_m$ and $Z_1, Z_2, \ldots Z_n$ that partition display screen 212. The brightness of the screen regions that are in the peripheral field may be decreased without reducing perceived visual information.

Comparing a display screen with small screen regions, as in FIG. 6B, to one with larger screen regions, as in FIG. 6A, suggests a number of design and implementation considerations.

One consideration may be that, with smaller screen regions, it is possible to dim a greater percentage of the display screen area than with larger screen regions. For example, in FIG. 6A, if a foveal point is at point 608 and thus within screen region 602, at best, only screen region 604 may be dimmed, because dimming screen region 602 can impair the perception of visual information in foveal area 610. In FIG. 6B, a foveal point is at point 612 and thus within screen region $R_{1,1}$. Thus, remaining screen regions $R_{2,1}, \ldots R_{n,1}$, $R_{1,2}, \ldots R_{n,2}, R_{2,2}, \ldots R_{n,2}, \ldots$ and $R_{n,m}$ may be dimmed. Screen regions $R_{2,1}, \ldots R_{n,1}, R_{1,2}, \ldots R_{n,2}, R_{2,2}, \ldots R_{n,2}, \ldots$ and $R_{n,m}$ cover a greater percentage of the display screen area than screen region 604.

Another consideration in dividing display screen 212 into small screen regions may be that, with small screen regions, it is possible to dim different screen regions to more than one brightness level. For example, in FIG. 6A, if a foveal point is at point 608 and thus within screen region 602, screen region 604 can be dimmed by recalibrating the luminance of the pixels within screen region 604 to one brightness level. In FIG. 6B, if a foveal point is at point 612 and thus within screen region $R_{1,1}$, screen regions $R_{1,2}, R_{2,2}$, and $R_{2,1}$ can be dimmed by recalibrating the luminance of the pixels within screen regions $R_{1,2}, R_{2,2}$, and $R_{2,1}$ to a first brightness level. All other screen regions that exclude $R_{1,1}, R_{1,2}, R_{2,2}$, and $R_{2,1}$ can be darkened by recalibrating the luminance of their pixels to the first or any darker brightness level. Screen regions that are distant from the foveal point at point 612 can be recalibrated to a brightness level that is darker than that at screen region $R_{1,1}$, because the visual acuity associated with perceived images at a location degrades as a function of the distance of the location to point 612.

Another consideration in dividing display screen 212 into small screen regions may be that, with small screen regions, it is possible to adjust the brightness of display screen 212 when foveal area 506 (FIG. 5) overlaps more than one screen region. In FIG. 6A, foveal area 614 that is associated with foveal point 616 overlaps screen regions 602 and 604. Accordingly, dimming screen region 602 or screen region 604 can impair the perception of visual information in foveal area 614. In this case, it may be beneficial to dim neither of screen regions 602 and 604. In FIG. 6B, foveal area 618 associated with foveal point 620 overlaps screen regions $R_{1,1}$, $R_{2,1}, R_{2,1}$, and $R_{2,2}$. Accordingly, dimming any of screen regions $R_{1,1}, R_{2,1}, R_{2,1}$, and $R_{2,2}$ can impair the perception of visual information in foveal area 618. In this case, it may be beneficial not do dim any of screen regions $R_{1,1}, R_{2,1}, R_{2,1}$, and $R_{2,2}$. However, the remaining screen regions in FIG. 6B may still be dimmed without incurring any degradation in perceived visual information.

The above-described consideration suggests implementations in which determining screen regions may include determining first a screen region which contains foveal point 508 as its center and then determining other screen regions, such that foveal area 506 overlaps at most with one screen region. In such implementations, the location of foveal point 508 is needed to determine the screen region which contains foveal point 508.

Yet another consideration in dividing display screen 212 into small screen regions may be that increasing the number of screen regions increases computational cost associated with adjusting the brightness of display screen 212. For example, if determining a single screen region shown in FIG. 6A or FIG. 6B requires 50 multiplication and 50 addition operations, greater number of computations may be needed to determine the screen regions in FIG. 6B than the screen regions in FIG. 6A, because display screen 212 in FIG. 6B includes more screen regions than that in FIG. 6A.

In implementing the present embodiment, it is possible to cap the computational cost by setting a lower limit on the size of screen regions. Generally, the lower limit can be set to a value roughly in the order of diameter 510 of foveal area 506, because diameter 510 provides an estimation of the approximate screen region size at which making screen regions smaller is not likely to significantly increase the percentage of display screen area that may be dimmed. However, if diameter 510 is smaller than the image resolving distance of eye-tracking logic 210, the lower limit can be set to the resolving distance.

If the computational cost does not impose a significant burden on CPU 204 and/or GPU 206, it is possible to determine screen regions which are much smaller than foveal area 506. In such scenario, the brightness of display screen 212 can be adjusted so that the brightness levels to which pixels are calibrated closely tracks visual acuity curve 512 in FIG. 5B.

Referring back to FIG. 4, at block 408, the screen location of foveal area 506 or foveal point 508 may be identified based on eye-tracking data from eye-tracking logic 210. The accuracy of the eye-tracking data and therefore, the precision at which the screen location can be identified, may depend on eye-tracking logic 210. For example, if eye-tracking logic 210 uses the dual-Purkinje image technique, the location of foveal point 508 may be identified within ±0.5 cm when display screen 212 is approximately 1 meter from a user's eye.

At block 410, based on the screen location, screen regions which contain foveal area 506 or foveal point 508 may be identified. For example, screen region 604 in FIG. 6A may be identified as containing foveal point 622 by testing whether the location of foveal point 622 is internal to each of screen regions 602 and 604.

In addition, depending on the type of display screen 212 included in device 100, the overall brightness of each pixel in the screen regions that overlap foveal area 506 may be determined. If device 100 includes a liquid crystal display, when the luminance of light source 308 is reduced, the entire display screen can be dimmed. To compensate for the loss in brightness in foveal area 506, the color shades of the sub-pixels in foveal area 506 may be re-calculated and the sub-pixels re-shaded, such that the color and brightness of each pixel in foveal area 506 may remain relatively constant. Such a maneuver may require the overall brightness of each pixel or each group of pixels to be determined and stored as references in memory 202. If device 100 does not include a liquid crystal display screen but includes another type of display screen 212, it may not be necessary to determine the overall brightness of each pixel.

At block 412, the effective distance of each screen region from foveal area 506 may be obtained. An effective distance may be a symbol or a number that is mapped, by a function, to a real number that approximately correlates with the distance from the centroid of a screen region to the centroid of foveal area 506. The term "centroid," as used herein, may refer to any point that may represent the center of a screen region, and the term may or may not be consistent with the mathematical definition of centroid. For example, in FIG. 6A, centroid 622 of screen region 604 is at the center of screen region 604. If the location of centroid 622 is denoted as coordinates (y1, z1) and the location of foveal point 608, which is the centroid of foveal area 610, is denoted as coordinates (y2, z2) in a Y-Z plane, then the distance from screen region 604 to foveal area 610 can be determined by the expression $((y1-y2)^2+(z1-z2)^2)^{1/2}$. While the expression for distance is in accordance with algebraic geometry, any expression for distance may be used.

At block 414, a darkness level may be assigned to each screen region. Assigning a darkness level to a screen region may include assigning a numerical value, which indicates the reduced level of brightness, to the screen region based on the effective distance of the screen region. The numerical value may also indicate a level of degradation of visual acuity away from foveal point 508.

Applying a darkness level to a screen region, at block 416, may include using the assigned numerical value to determine colors for each pixel. The manner of using the assigned numerical value to determine colors may depend on what the numerical value represents and the specific strategy, method, steps, or processes that are employed to arrive at the colors that reflect the darkness level. The determined colors can be stored in one or more buffers in memory 202.

If device 100 includes a liquid crystal display, it may be necessary to use, in conjunction with the assigned numerical values, the overall brightness for each pixel in determining the colors. Further, if the liquid crystal display includes many lamps underneath a light guide that emits more light near a lamp, backlight in screen regions that the user is not looking may be reduced by decreasing the brightness of the lamps in those screen regions.

If device 100 includes an OLED display screen, when determining the colors, green color may be weighted more heavily. For OLED display screens, emitting green color consumes less energy than emitting other colors.

At block 418, using the determined colors, display screen 212 may be redrawn, to reflect the brightness adjustment.

Blocks 404-418 may be repeated periodically to reflect changes in the location of foveal point 508, though not necessarily in the order that blocks 404-418 have been described above.

Exemplary Adjustment of Screen Refresh Rates

Figure 7:
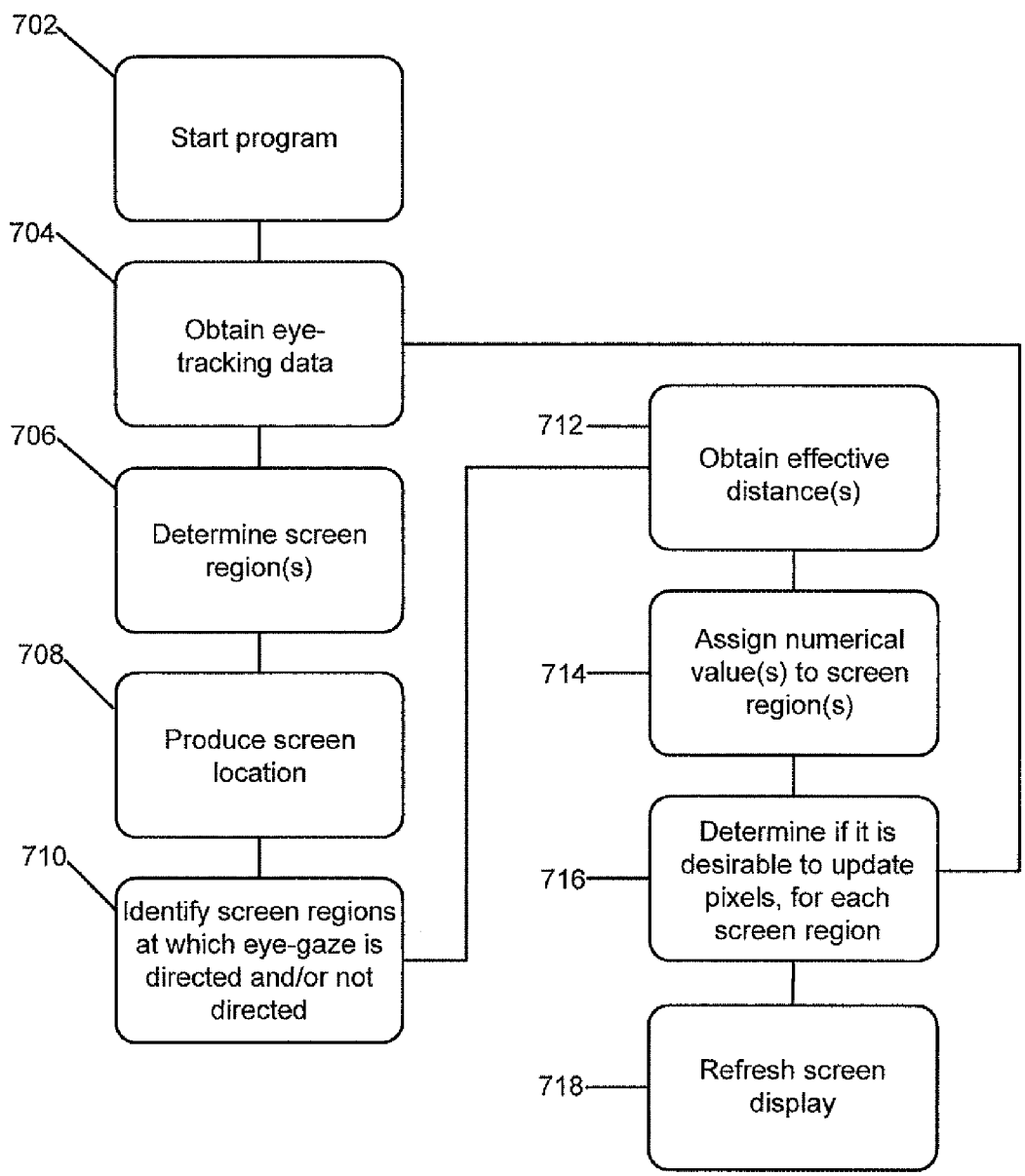
FIG. 7 shows an exemplary process for adjusting screen refresh rates for a bistable display screen.

FIG. 7 shows an exemplary process for adjusting screen refresh rates for a bistable display screen. At block 702, a program may be started either automatically or when instructed by a user at device 100. The program may be a device driver, a daemon that resides in memory 202, or any program that may perform one or more tasks associated with adjusting the screen refresh rates. After the program starts, eye-tracking data may be obtained from eye-tracking logic 210 (block 704).

At block 706, screen regions within display screen 212 may be determined in accordance with specific strategies and implementation considerations. Strategies and implementation considerations similar to those discussed above with regard to block 406 in FIG. 4 may apply to block 706.

At block 708, the screen location of foveal area 506 or foveal point 508 may be produced based on eye-tracking data in a manner similar to that described above with respect to block 408. Based on the screen location, screen regions which contain foveal area 506 or foveal point 508 may be identified at block 710 in a manner similar to that described with regard to block 410. At block 712, the effective distance of each screen region from foveal area 506 may be obtained in a manner similar to that described with respect to block 712

At block 714, a numerical value, which indicates a reduced rate of screen refresh, may be assigned to each screen region that does not overlap foveal area 506. The numerical value may also reflect a level of degradation of visual acuity away from foveal point 508.

At block 716, the assigned numerical values may be used to determine whether to update pixels within each screen region when display screen 212 is refreshed.

At block 718, display screen 212 is refreshed based on the results of block 716. When display screen 212 is refreshed, only the screen regions that overlap foveal area 506 may be updated. The screen regions that do not overlap foveal area 506 may not be updated. Preventing updates of the screen regions that do not overlap foveal area 506 may have the effect of decreasing refresh rates in the same screen regions.

Blocks 704-716 may be repeated periodically to reflect changes in the location of foveal point 508, though not necessarily in the order that blocks 704-716 have been described above.

Alternative Implementations

Many changes to the adjustment processes described above for screen brightness and for screen refresh rates may be implemented. In an alternative implementation of the brightness adjustment process, at block 406 in FIG. 4, determining screen regions may be performed only once and its results may be stored prior to performing any of blocks 404 and 408-418. Additional parameters, such as centroids, may be computed and stored along with information related to the screen regions. In such implementations, blocks 404 and 408-418 may be repeatedly performed.

Similar changes to the process shown in FIG. 7 for adjusting the screen refresh rate may be implemented.

In yet another implementation, both screen refresh rates and screen brightness may be adjusted, if device 100 includes a bistable display screen and a display screen with internal light sources or, alternatively, a hybrid of a bistable display screen and a display screen with internal light sources. For the hybrid, the adjustment processes for screen brightness and for screen refresh rates may be combined into one. The combined process may include blocks 402-418 and blocks 714-718.

In other implementations, at block 406 or block 706, determining screen regions may include determining a screen region which contains foveal point 508 as its center and then determining other remaining screen regions. In such implementations, block 408/708 may precede block 406/706, because the location of foveal point 508 may be used to determine the screen region which contains foveal point 508.

Further, many of the computations within each block may be performed in parallel, depending on the number of processors, microprocessors, processing logic, and/or graphics processors included in CPU 204 and/or GPU 206. For example, two processors in CPU 204 and/or GPU 206 may concurrently perform computations for block 414 or block 714. Each processor may handle a different set of screen regions. Similar parallel processing may be performed for each of blocks, 406/706 and 410/710-418/718.

In one implementation, device 100 may provide specialized hardware and software support for adjusting the brightness of display screen 212. For example, CPU 206 may include specialized hardware/software components for performing brightness transformations of display screen regions. In addition, software components may provide different buffering schemes for fast graphics operations.

EXAMPLE

The following example illustrates processes involved in adjusting display screen brightness in accordance with implementations described with respect to FIGS. 1 and 4.

Assume that device 100 includes a 1280×1024 CRT display screen. After powering up, a program is automatically started on device 100. The program implements a screen determining strategy that partitions the display screen into two equal areas.

When a user fixes her eyes to screen coordinates (320, 512), measured in pixels, eye-tracking logic 210 provides eye-tracking data. Based on the eye-tracking data, the location of a foveal point on the display screen is computed as screen coordinates (320, 512).

In the example, screen regions are determined as 1×2 rectangles, as shown in FIG. 6A. Further, the particular screen region that contains the foveal point at screen coordinates (320, 512) is identified as screen region 602.

For each of screen regions 602 and 604, an effective distance is computed. For example, based on the fact that the center of screen region 602 is located at screen coordinates (320, 512), effective distance d from screen region 602 to the foveal area is computed as 0. Similarly, effective distance d from screen region 604 to the foveal area is computed as 640.

The effective distances are then used to assign brightness level 1.0 to screen region 602 and brightness level 0.5 to screen region 604. In this example, brightness level is the ratio of desired color intensity, in red, green, and blue (RGB) value, to the color intensity without any brightness adjustment.

Assuming that all pixels without any brightness adjustments in screen regions 602 and 604 have the RGB color value of (255, 0, 0), applying brightness level 1.0 to screen region 602 yields the RGB value of (255, 0, 0) for all pixels in screen region 602. Applying brightness level 0.5 to screen region 604 yields the ROB value of (128, 0, 0) for all pixels in screen region 604.

On the CRT display screen, colors (255, 0, 0) and (128, 0, 0) are displayed for screen regions 602 and 604, respectively. When the user moves her eyes from screen coordinates (320, 512) to (960, 512) on the display screen, the eye-tracking logic detects the change and the program restarts the screen brightness adjustment process.

CONCLUSION

The foregoing description of embodiments provides illustration, but is not intended to be exhaustive or to limit the embodiments to the precise form disclosed. Modifications and variations are possible in light of the above teachings or may be acquired from practice of the teachings.

For example, while series of blocks have been described with regard to processes illustrated in FIGS. 4 and 7, the order of the blocks may be modified in other implementations. Further, non-dependent blocks may represent acts that can be performed in parallel.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

It should be emphasized that the term "comprises/comprising" when used in this specification is taken to specify the presence of stated features, integers, steps or components but does not preclude the presence or addition of one or more other features, integers, steps, components, or groups thereof.

Further, certain portions of the invention have been described as "logic" that performs one or more functions. This logic may include hardware, such as a processor, an application specific integrated circuit, or a field programmable gate array, software, or a combination of hardware and software.

What is claimed is:

1. A method comprising:
   determining, using one or more processors, a first area at which a user gazes on a display screen;
   identifying, using one or more processors, on the display screen, a screen region that does not overlap the first area, wherein the screen region includes a first portion and a second portion;

determining a first distance between the first area and the first portion;
determining a second distance between the first area and the second portion;
assigning, based on the first distance, a first value to the first portion;
assigning, based on second distance, a second value to the second portion, wherein the second value is different from the first value;
determining, using one or more processors, a brightness level of the identified screen region that does not overlap the first area at which the user gazes on the display screen;
darkening, using one or more processors, the first portion to a first brightness level based on the first value; and
darkening, using the one or more processors, the second portion to a second brightness level based on the second value, wherein the second brightness level is different than the first brightness level.

2. The method as in claim 1, further comprising:
determining a size and a location of a screen region which overlaps the first area.

3. The method as in claim 1, further comprising:
determining a distance from the identified screen region to the first area.

4. The method as in claim 1, further comprising:
determining colors of pixels in the identified screen region.

5. The method as in claim 4, where darkening the first and second portions of the identified screen region includes displaying the determined colors.

6. The method as in claim 1, where determining the first area at which the user gazes includes determining the area based on eye-tracking data.

7. The method as in claim 6, further comprising:
monitoring a position of an eye of the user; and
generating the eye-tracking data based on the monitored position.

8. The method as in claim 1, where determining the first area at which the user gazes includes estimating the first area based on user inputs.

9. A device comprising:
one or more processors to:
obtain an area at which a user gazes on a display screen;
identify one or more portions of the display screen;
select at least one identified portion of the display screen, from the identified one or more portions of the display screen, that includes at least part of the area at which the user gazes on the display screen;
determine a brightness level of at least one portion of the display screen, from the identified one or more portions of the display screen, that is not selected and that does not include at least part of the area at which the user gazes on the display screen;
generate a luminance value for the at least one portion of the display screen, from the identified one or more portions of the display screen, that is not selected and that does not include at least part of the area at which the user gazes on the display screen, based on the determined brightness level; and
dim the at least one portion of the display screen, from the identified one or more portions of the display screen, that is not selected and that does not include at least part of the area at which the user gazes on the display screen, based on the generated luminance value, wherein the at least one portion includes a first portion and a second portion and wherein when dimming the at least one portion, the one or more processors are configured to:
dim the first portion to a first brightness based on a first distance between the area at which the user gazes and the first portion, and
dim the second portion to a second brightness based on a second distance between the area at which the user gazes and the second portion, wherein the second brightness level is different than the first brightness level.

10. The device as in claim 9, where the area covers, on the display screen, a visually acute portion of a visual field of the user.

11. The device as in claim 9, where the one or more identified screen portions are contiguous.

12. The device as in claim 9, where the one or more identified screen portions are not contiguous.

13. The device as in claim 9, further comprising an eye-tracking logic to:
monitor a position of an eye of the user; and
determine eye-tracking data based on the monitored position.

14. The device as in claim 9, where the one or more processors are further to:
determine a size and a position of at least one of the one or more identified portions.

15. The device as in claim 9, where the one or more processors are further to:
determine a distance from the area to one of the one or more identified portions.

16. The device as in claim 9, where the one or more processors are further to:
produce colors for pixels in at east one portion that is not selected and that does not include at least part of the area.

17. The device as in claim 9, where the one identified portion includes an entire area of the display screen.

18. A device comprising:
one or more processors to:
locate an area at which a user gazes on a display screen;
identify portions of the display screen;
select at least a first portion that includes at least part of the area at which the user gazes on the display screen;
determine a distance between the first portion and other portions of the display screen that do not include the first portion;
assign, based on the determined distance, a first numerical value to at least one of the other portions that does not include the first portion, the assigned first numerical value indicating a reduced rate of display screen refresh for the at least one other portion,
wherein the selected at least first portion is at a first brightness level, and wherein the other portions are at a second, different brightness level;
assign, based on the determined distance, a second, different numerical value to a second one of the other portions, the assigned second, different numerical value indicating a reduced rate of display screen refresh for the second one of the other portions; and
refresh the display screen by updating the selected first portion, not updating the other portions, based on the assigned first numerical value, and updating the second other portion to a third, different brightness level, based on the assigned second, different numerical value.

19. The device as in claim 18, where the area covers on the display screen a visually acute portion of a visual field of the user.

20. A method comprising:
   determining, using one or more processors, an area at which a user gazes on a display screen;
   identifying, using one or more processors, screen regions that overlap the area at which a user gazes on the display screen, wherein the screen regions include a first screen region and a second screen region;
   determining a distance between the area at which the user gazes and each of the first and second screen regions;
   assigning, using one or more processors, a numerical value to each of the first and second screen regions based on the determined distance for each of the first and second screen regions, the assigned numerical value indicating a reduced rate of display screen refresh for each of the first and second screen regions,
   where a first assigned numerical value of the first screen region is different than a second assigned numerical value of the second screen region; and
   refreshing, using one or more processors, the display screen by updating the identified screen regions that overlap the area at which a user gazes on the display screen, updating the first screen region based on the first assigned numerical value and not updating the second screen region based on the second assigned numerical value,
   where the second screen region is at a first brightness level, and the first screen region is updated to a second, different brightness level.

21. The method as in claim 20, where determining the area at which the user gazes includes locating the area based on eye-tracking data.

22. The method as in claim 21, further comprising:
   tracking a direction of an eye of the user; and
   generating the eye-tracking data based on the tracked direction.

23. The device of claim 18, where, when locating the area at which the user gazes on the display screen, the one or more processors are further to:
   monitor a position of an eye of the user, and
   determine eye-tracking data based on the monitored position, and
   where the one or more processors are further to refresh the display screen based on the determined eye-tracking data.

* * * * *